UNITED STATES PATENT OFFICE.

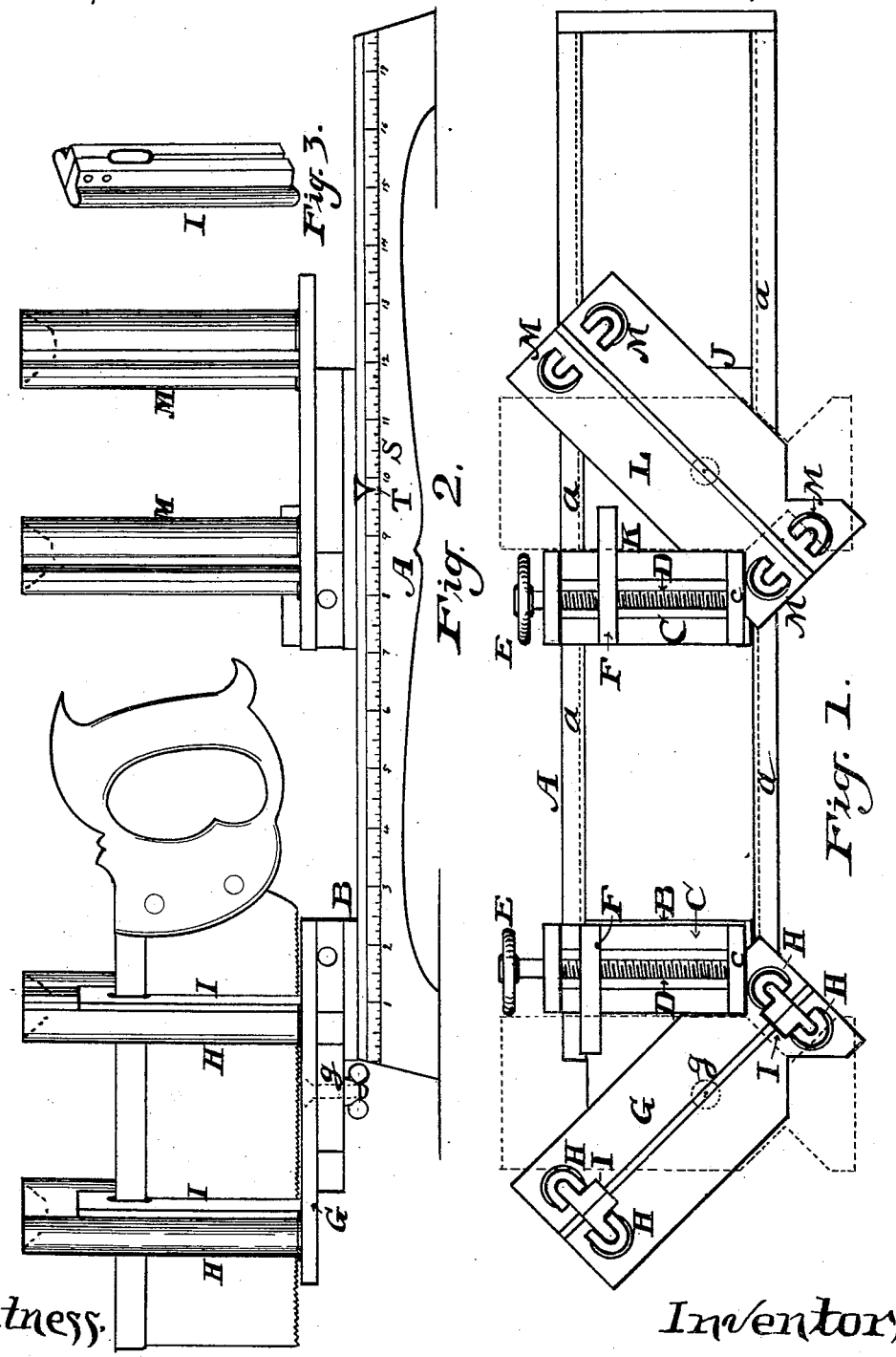

CHARLES F. MARQUARD, OF CLEVELAND, OHIO.

MITERING-MACHINE.

SPECIFICATION forming part of Letters Patent No. 486,724, dated November 22, 1892.

Application filed May 13, 1892. Serial No. 432,826. (No model.)

*To all whom it may concern:*

Be it known that I, CHARLES F. MARQUARD, a citizen of Cleveland, county of Cuyahoga, and State of Ohio, have invented certain new and useful Improvements in Mitering-Machines, of which the following is a specification.

This invention relates to machines for sawing miters; and it consists in the new constructions and combinations, as hereinafter described, and pointed out in the claims.

In the accompanying drawings, Figure 1 is a top or plan view of my new mitering-machine. Fig. 2 is a front elevation of same. Fig. 3 is a detached view of one of the saw-guides.

A represents a base-frame which supports the working parts.

B is a plate or table secured to the left-hand end of the frame A, upon which is permanently fixed a clamp or vise for holding the material to be cut, consisting of a frame C, having a clamping-screw D journaled in the end bars and provided with a hand-wheel or crank E on the rear end.

F is a traveling jaw fixed to ride in between the side bars of frame C, through which the screw D plays for moving said jaw. The front end bar c of frame C constitutes the fixed jaw of the clamp.

G is a plate fixed on center pin or bolt g having thumb-nut, by means of which the plate may be turned to the required angle and secured. This plate forms the base for the saw-guides.

H are grooved or angle posts fixed to stand in pairs at each end of the plate G, with the grooves facing each other in each pair.

I are removable saw-guides consisting of two angle-bars secured together at their top ends, as seen in Fig. 3, having open space between them to admit the passage of the saw, as seen in Fig. 2, the side angles of said bars fitted to slide in the grooves of the posts H, as seen in Fig. 1.

J is a plate like plate B, but instead of being stationary is arranged to slide in grooves or ways *a a* in the side rails of frame A to enable the plate, with its clamp and saw-guides, to be adjusted in its relation with the fixed jaw and guides, the purpose of which is to provide for sawing both a right and left hand miter or bevel on the ends of a piece of molding without removal or readjustment of the material from the clamps.

K is a clamp just like C fixed to the plate J, and L is a swiveled plate like G and is provided with grooved posts M like those on plate G. The plates G and J may be turned to cut a square joint, as indicated by the dotted lines.

S is a scale on the side of the frame A, and on the plate or carriage J is provided a pointer T, by means of which the carriage may be readily adjusted for cutting molding at any required length.

From the foregoing the uses and working of this device will be seen to be as follows: For sawing miters the plates with the guide-posts are adjusted to the angle of forty-five degrees, as shown, the movable carriage is adjusted to the required length, the molding is laid on with its inside edge up against the fixed jaw *c*, and the screws D rotated for gripping the molding with the moving jaw F, the saw having the guides I slipped onto it; or if the guides should be first placed in the posts the saw may be pushed through them by raising them so that the saw could pass over the molding until inserted through both guides. Now the saw may be worked for sawing the miter. When one end has been cut, the saw is raised, withdrawing the guides up out of the posts, and transferred to the other posts for cutting the miter at the opposite end.

By the use of machine both the miters on a piece of molding are cut without removing the molding for adjustment, greatly facilitating the work and expediting the means of making perfect miter-joints.

The tops of the posts are beveled on their inside edges, forming a funnel-mouth for the easy insertion of the saw-guides when introducing them with the saw, and they also form a convenient seat for resting the foot of the guide nearest to the handle of the saw by raising the saw and tilting the handle end up and allowing the foot of the guide to catch and rest there. The other guide does not rise to the top but hangs in the groove a short distance. The saw being tilted slightly in the guides, they, together with the saw, will remain in the elevated position. The purpose of this is to allow for the removal or insertion of molding in the machine without entirely removing the saw.

Having described my invention, I claim—

1. In a mitering-machine, the bed-frame A, plate B, firmly fixed onto said frame, a clamp fixed to plate B, consisting of frame C, screw D, traversing jaw F, and the fixed jaw c, plate G, mounted on plate B by bolt g, grooved posts H H, standing on plate G, and movable saw-guides I I, supported in said posts, all constructed and combined to operate substantially as and for the purpose set forth.

2. In a mitering-machine, the combination, with bed-frame A, of the adjustable carriage K, having the fixed clamp C D, and swiveled plate L, provided with the grooved posts M, substantially as and for the purpose set forth.

3. In a mitering-machine, the combination, with bed-plate A and adjustable carriage K, provided with clamp C D, and swiveled plate L, having grooved posts M, of the scale S and pointer T, substantially as and for the purpose set forth.

CHARLES F. MARQUARD.

Witnesses:
GEO. W. TIBBITTS,
D. C. GROVER.